(12) United States Patent
Idaka

(10) Patent No.: US 12,177,566 B2
(45) Date of Patent: Dec. 24, 2024

(54) APPARATUS, METHOD, AND RECORDING MEDIUM THAT DETECTS BLUR OF AN IMAGE AT A FIRST FREQUENCY BAND IN A CASE WHERE THE DRIVE VELOCITY IS IN A RESONANCE VELOCITY RANGE

(71) Applicant: CANON KABUSHIKI KAISHA, Tokyo (JP)

(72) Inventor: Sayuri Idaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 18/298,671

(22) Filed: Apr. 11, 2023

(65) Prior Publication Data
US 2023/0345125 A1    Oct. 26, 2023

(30) Foreign Application Priority Data

Apr. 21, 2022 (JP) ................................. 2022-070144

(51) Int. Cl.
*H04N 5/335* (2011.01)
*H04N 23/68* (2023.01)
*H04N 23/69* (2023.01)

(52) U.S. Cl.
CPC ....... *H04N 23/6815* (2023.01); *H04N 23/683* (2023.01); *H04N 23/69* (2023.01)

(58) Field of Classification Search
CPC .................................................. H04N 23/6815
See application file for complete search history.

(56) References Cited

U.S. PATENT DOCUMENTS

| 2008/0129830 | A1* | 6/2008 | Inoue | G03B 5/00 |
| | | | | 348/208.2 |
| 2009/0262425 | A1* | 10/2009 | Kimura | G03B 5/00 |
| | | | | 359/557 |
| 2015/0062358 | A1* | 3/2015 | Takeuchi | H04N 23/6811 |
| | | | | 348/208.1 |
| 2020/0322517 | A1* | 10/2020 | Tani | H04N 23/6812 |

FOREIGN PATENT DOCUMENTS

| JP | 2005020399 A | 1/2005 |
| JP | 2015049401 A | 3/2015 |

* cited by examiner

*Primary Examiner* — Gary C Vieaux
(74) *Attorney, Agent, or Firm* — Canon U.S.A., Inc. IP Division

(57) ABSTRACT

An apparatus includes an imaging unit configured to acquire an image, a drive unit configured to drive the imaging unit, a control unit configured to control the drive unit, a detection unit configured to detect a blur of the acquired image, a correction unit configured to correct the detected blur of the image, an acquisition unit configured to acquire a drive velocity at which the drive unit drives the imaging unit, and a setting unit configured to set the detection unit. The setting unit sets the detection unit such that in a case where the drive velocity is in a resonance velocity range in which resonance occurs in the imaging unit, the detection unit detects the blur of the image at a first frequency band corresponding to a blur due to the resonance.

20 Claims, 10 Drawing Sheets

APPARATUS, METHOD, AND RECORDING MEDIUM THAT DETECTS BLUR OF AN IMAGE AT A FIRST FREQUENCY BAND IN A CASE WHERE THE DRIVE VELOCITY IS IN A RESONANCE VELOCITY RANGE

BACKGROUND

Technical Field

The aspect of the embodiments relates to an apparatus, a method, and a recording medium.

Description of the Related Art

A conventional pan and tilt (pan/tilt) camera for viewing video images by controlling the camera via a network and using a dedicated circuit and a remote controller is known. A pan/tilt camera includes a mechanism that is rotatable in a pan direction (horizontal direction) and a tilt direction (vertical direction), and an imaging direction is freely changeable based on user instructions.

Driving of the camera in the pan and tilt directions is controlled by controlling a motor. For example, in a case of open-loop control using a stepping motor, angular positions of a pan drive unit and a tilt drive unit are controlled by controlling the number of pulses to be applied to the motor.

A drive velocity of the camera is changed by changing a drive frequency using pulse width modulation (PWM). In a case where the drive frequency is low, the motor is slow, whereas in a case where the drive frequency is high, the motor is fast.

Depending on the drive velocity of the motor, however, the drive frequency of the motor may cause resonance in the camera, and this may cause a significant vibration or strange noise. Such a significant vibration may result in a blur of a video image. Further, resonance in the camera while the camera is driven at a constant velocity may lead to inconsistent velocity with slight changes in the velocity of the camera, causing a blur of a video image.

Japanese Patent Application Laid-Open No. 2005-20399 discusses a technique for preventing resonance. Specifically, in a case where a set velocity of one of a pan drive unit and a tilt drive unit that is smaller in drive amount than the other is in a resonance velocity range in a simultaneous operation of pan driving and tilt driving, the set velocity is reset to a high speed to avoid the resonance velocities.

Japanese Patent Application Laid-Open No. 2015-49401 discusses a technique for suitably correcting a blur even in a case where a great vibration occurs due to pan or tilt correction. Specifically, in a case where panning or tilting is being performed, a cutoff frequency of a low-pass filter for use in correcting a blur of a video image is set to a high value.

The technique discussed in Japanese Patent Application Laid-Open No. 2005-20399 may be insufficient for prevention of resonance in a case where the set velocity of the drive unit that is greater in drive amount than the other is in the resonance velocity range.

With the technique discussed in Japanese Patent Application Laid-Open No. 2005-20399, a blur may not be corrected suitably in a case where pan driving and tilt driving are frequently performed, e.g., a case where a camera tracks a person.

SUMMARY

According to an aspect of the embodiments, an apparatus includes an imaging unit configured to acquire an image, a drive unit configured to drive the imaging unit, a control unit configured to control the drive unit, a detection unit configured to detect a blur of the acquired image, a correction unit configured to correct the detected blur of the image, an acquisition unit configured to acquire a drive velocity at which the drive unit drives the imaging unit, and a setting unit configured to set the detection unit such that in a case where the drive velocity is in a resonance velocity range in which resonance occurs in the imaging unit, the detection unit detects the blur of the image at a first frequency band corresponding to a blur due to the resonance.

Further features of the disclosure will become apparent from the following description of exemplary embodiments with reference to the attached drawings.

DESCRIPTION OF THE EMBODIMENTS

Various exemplary embodiments of the disclosure will be described below with reference to the attached drawings. The exemplary embodiments described below are mere examples of implementation of the disclosure and should be modified or changed as appropriate for a configuration of an apparatus to which the disclosure is applied or for various conditions, and the disclosure is not limited to the exemplary embodiments described below.

Apparatus Configuration

Figure 1:
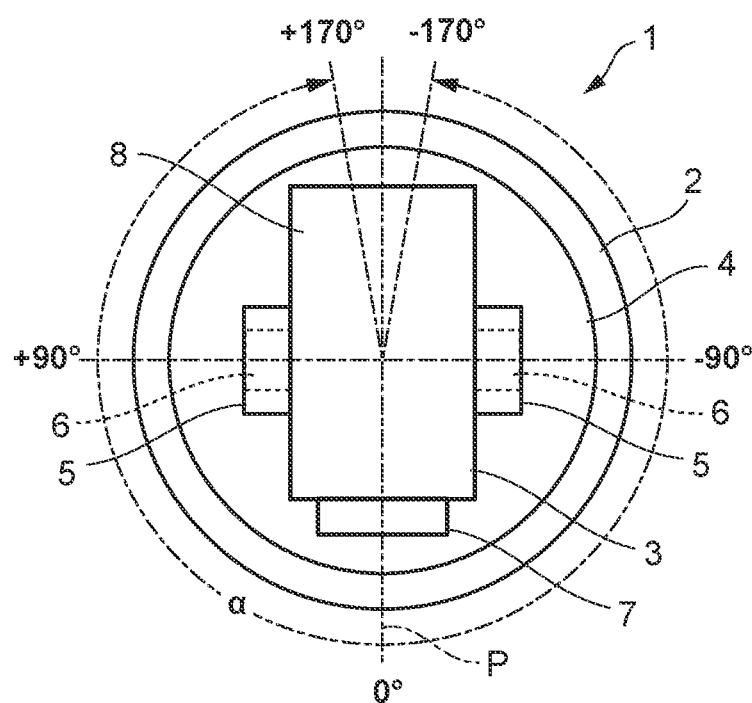
FIG. 1 is a plan view illustrating an imaging apparatus according to an exemplary embodiment of the disclosure.
Figure 2:
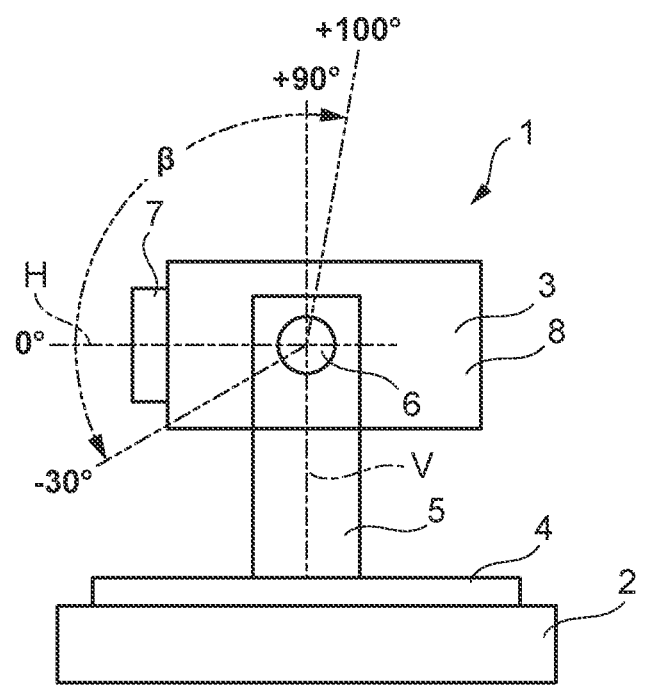
FIG. 2 is a side view illustrating the imaging apparatus according to an exemplary embodiment of the disclosure.

As illustrated in FIGS. 1 and 2, a pan/tilt camera 1 is supported by a bottom plate 2. The pan/tilt camera 1 is an imaging apparatus 1 according to an exemplary embodiment of the disclosure. The pan/tilt camera 1 includes a camera body 3, a turntable 4, two supports 5, and two tilt rotary shafts 6.

The camera body 3 includes a lens barrel 7 and a housing 8.

The lens barrel 7 faces a subject. Inside the lens barrel 7 are lenses for use in imaging (not illustrated), such as a focus lens, a zoom lens, and a blur correction lens. Thus, the pan/tilt camera 1 is a pan/tilt/zoom camera capable of performing electric zooming and has a freely-changeable imaging angle of view.

Inside the housing 8 is an imaging sensor (not illustrated) for capturing images. Light transmitted through the lens barrel 7 is received by the imaging sensor and forms an image. The imaging sensor is, for example, a complementary metal oxide semiconductor (CMOS) image sensor or a charge-coupled device (CCD) image sensor.

The turntable 4 is supported by the bottom plate 2 to be rotatable horizontally on a vertical axis V. Thus, the camera body 3 on the turntable 4 can rotate in a pan direction (horizontal direction).

Inside the bottom plate 2 is a pan drive motor (not illustrated in FIG. 1), and the pan drive motor drives the turntable 4 in the pan direction. The pan drive motor can rotate the camera body 3 in the pan direction within an angle range α of, for example, −170 degrees to +170 degrees from a pan reference axis P illustrated in FIG. 1 as a reference.

The two supports 5 are fixed to the turntable 4, and the camera body 3 is held between the supports 5. Two tilt rotary shafts 6 extend concentrically in the horizontal direction and are attached to the two supports 5 and each attached to the camera body 3. Thus, the camera body 3 can be rotatable on the tilt rotary shafts 6 in a tilt direction (vertical direction).

Meanwhile, a tilt drive motor (not illustrated in FIG. 1) is attached to the supports 5 and drives the camera body 3 in the tilt direction. The tilt drive motor can rotate the camera body 3 in the tilt direction within an angle range β of, for example, −30 degrees to 100 degrees from a horizontal axis H illustrated in FIG. 2 as a reference.

As described above, the camera body 3 is rotated in the horizontal and vertical directions, and this enables the pan/tilt camera 1 to perform imaging over a wide range while changing an imaging direction.

Note that the pan/tilt camera 1 is not limited to the illustrated configuration and, for example, can be attached on a ceiling surface of a building or can be covered with a transparent dome cover.

The angle range α of rotation in the pan direction is not limited to the illustrated range, and the pan drive motor can rotate the camera body 3 endlessly in, for example, an angle range greater than 360 degrees. Similarly, the angle range β of rotation in the tilt direction is not limited to the illustrated range, and the tilt drive motor can rotate the camera body 3 in, for example, an angle range of 180 degrees.

Figure 3:
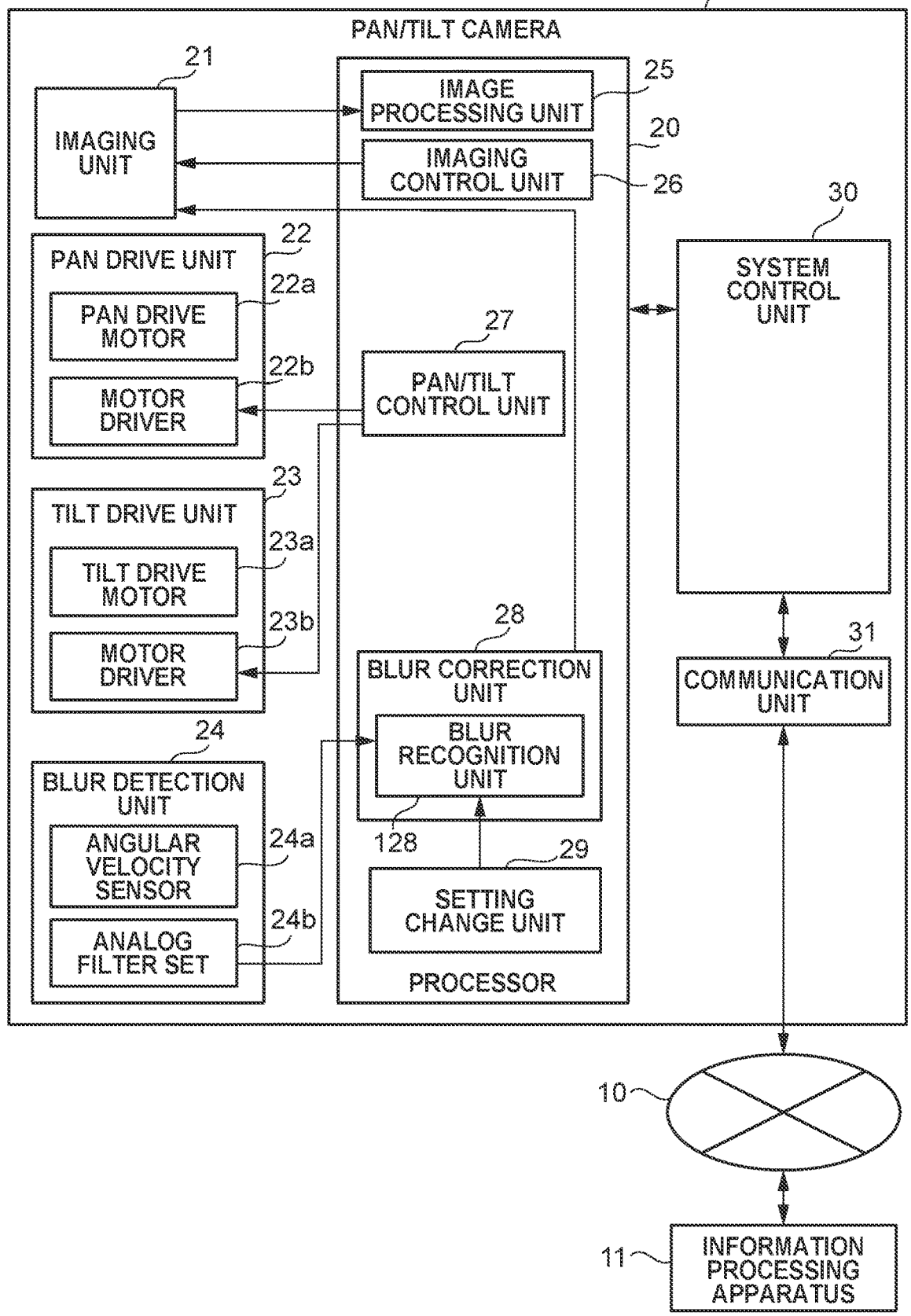
FIG. 3 is a block diagram illustrating a functional configuration of the imaging apparatus according to an exemplary embodiment of the disclosure.

As illustrated in FIG. 3, the pan/tilt camera 1 can communicate with an information processing apparatus 11, which is an external information processing apparatus, via a network 10. Specifically, the pan/tilt camera 1 is a network camera.

A user of the information processing apparatus 11 can transmit various commands to the pan/tilt camera 1 using the information processing apparatus 11. The commands include commands to drive the pan/tilt camera 1 in the pan direction, commands to drive the pan/tilt camera 1 in the tilt direction, commands to zoom the pan/tilt camera 1, and commands to adjust the focus of the pan/tilt camera 1.

The information processing apparatus 11 includes a display (not illustrated), and the display displays an image captured by the pan/tilt camera 1. The user of the information processing apparatus 11 can view the image displayed on the display.

The pan/tilt camera 1 includes a processor 20, an imaging unit 21, a pan drive unit 22, a tilt drive unit 23, a blur detection unit 24, a system control unit 30, and a communication unit 31.

The processor 20 includes an image processing unit 25, an imaging control unit 26, a pan/tilt control unit 27, a blur correction unit 28, and a setting change unit 29.

The imaging unit 21 includes a mechanism for moving at least the zoom lens among the above-described lenses for imaging, a circuit for driving the mechanism, the imaging sensor, a circuit for driving the imaging sensor, and a conversion circuit for converting image data supplied from the imaging sensor into electric signals. Zooming and focusing are performed by moving one or more of the lenses for imaging. The imaging unit 21 moves the blur correction lens among the lenses for imaging to correct a blur of a video image captured by the camera body 3.

The pan drive unit 22 includes a pan drive motor 22a described above and a motor driver 22b for rotating the pan drive motor 22a. The pan drive motor 22a is, for example, a stepping motor and disposed inside the bottom plate 2. The motor driver 22b is controlled by the pan/tilt control unit 27 of the processor 20. The motor driver 22b is also disposed inside the bottom plate 2.

The tilt drive unit 23 includes a tilt drive motor 23a described above and a motor driver 23b for rotating the tilt drive motor 23a. The tilt drive motor 23a is, for example, a stepping motor and is attached to one of the supports 5. The motor driver 23b is controlled by the pan/tilt control unit 27 of the processor 20. The motor driver 23b can be attached to the supports 5 or disposed inside the bottom plate 2.

The blur detection unit 24 includes an angular velocity sensor 24a, such as a gyro sensor, and an analog filter set 24b. The angular velocity sensor 24a is attached to, for example, the camera body 3 and detects angular velocities of the camera body 3 in yaw and pitch directions. The angular velocity sensor 24a is mounted on the camera body 3 to detect the angular velocities of the camera body 3 in the yaw and pitch directions.

The blur detection unit 24 can separately include an angular velocity sensor for the yaw direction and an angular velocity sensor for the pitch direction or can include a single angular velocity sensor capable of simultaneously detecting angular velocities on two or three axes. Alternatively, the blur detection unit 24 can include a single sensor that includes a combination of a triaxial angular velocity sensor and a triaxial acceleration sensor and is capable of detecting six-axis inertia.

The analog filter set 24b includes various analog filters to remove high-frequency noise from detection signals of the angular velocity sensor 24a. Because the analog filters are publicly known, the detailed descriptions are omitted. The analog filter set 24b can be attached to the camera body 3 or disposed inside the bottom plate 2.

The blur detection unit 24 supplies angular velocity information obtained by the noise removal performed by the analog filter set 24b to a blur recognition unit 128 of the blur correction unit 28 of the processor 20, and the blur recognition unit 128 performs blur recognition (detection) to recognize (detect) a blur of a video image captured by the camera body 3, based on the angular velocity information. The blur correction unit 28 corrects the blur of the video image captured by the camera body 3, based on the recognized (detected) blur.

The processor 20 is, for example, a central processing unit (CPU) and is disposed, for example, inside the bottom plate 2. The processor 20 performs functions of the image processing unit 25, the imaging control unit 26, the pan/tilt control unit 27, the blur correction unit 28, and the setting change unit 29 by executing a program read from a storage unit (not illustrated).

The image processing unit 25 performs image processing, such as noise removal and gamma correction, on an image-related electric signal converted by the imaging unit 21, generates image data, and transmits the generated image data to the system control unit 30. In a case where an image quality adjustment command is received from the system control unit 30, the image processing unit 25 performs image quality adjustment.

The imaging control unit 26 controls the imaging unit 21 based on commands received from the system control unit 30. For example, in a case where a zoom position change command or a focus position change command is received from the system control unit 30, the imaging control unit 26 controls the imaging unit 21 to drive the focus lens or the zoom lens based on the command received by the imaging unit 21.

The pan/tilt control unit 27 processes pan/tilt control-related commands received from the system control unit 30 by the image processing unit 25. Then, the pan/tilt control unit 27 controls drive amounts, velocities, and accelerations/decelerations of the pan drive unit 22 and the tilt drive unit 23 based on the command. When necessary, the pan/tilt control unit 27 performs an initialization operation to initialize the pan drive unit 22 and the tilt drive unit 23.

The pan/tilt control unit 27 can perform pan driving and tilt driving of the camera body 3 individually or simultaneously.

The pan/tilt control unit 27 can perform a preset function of simultaneously starting pan driving and tilt driving and simultaneously stopping pan driving and tilt driving. In a case where the user of the information processing apparatus 11 instructs the pan/tilt camera 1 to perform the preset function, the pan/tilt control unit 27 calculates a target velocity of panning and a target velocity of tilting based on a drive angle and time that are designated by the user. Then, the pan/tilt control unit 27 controls rotation velocities of the pan drive unit 22 and the tilt drive unit 23 to achieve the calculated target velocities.

The blur correction unit 28 includes the blur recognition unit 128. As described below, the blur recognition unit 128 derives a blur angle value based on an angular velocity detected by the blur detection unit 24. The blur angle value refers to an angle indicating how much an imaging range is changed due to vibration and the like. The blur recognition unit 128 calculates a blur correction amount based on the blur angle value. The blur correction amount refers to a value relating to a drive amount in moving the blur correction lens to reduce effects of a change in the imaging range due to vibration. Specifically, the blur correction amount is calculated as a value that cancels the blur angle value (i.e., a value obtained by reversing a plus/minus of the blur angle value). For example, in a case where the blur angle value is a pitch angle of 0.5 degrees (°), the blur correction amount is −0.5°. The blur correction unit 28 controls the imaging unit 21 using the calculated blur correction amount to drive the blur correction lens in the lens barrel 7, whereby a blur of a captured video image is corrected. While the blur correction according to the present exemplary embodiment is optical blur correction by driving the blur correction lens, electronic blur correction by shifting pixels of the imaging sensor based on a blur amount can be used.

The setting change unit 29 changes settings of the blur recognition unit 128. Details thereof will be described below.

The system control unit 30 comprehensively controls operation of the pan/tilt camera 1. Specifically, the system control unit 30 analyzes camera control commands transmitted from the communication unit 31 and transmits the commands that relate to the imaging control unit 26 or the pan/tilt control unit 27 to the imaging control unit 26 or the pan/tilt control unit 27. For example, in a case where a standby state command is received, the system control unit 30 issues an instruction to the imaging control unit 26 to change to a standby state, whereas in a case where a command to recover from a standby state is received, the system control unit 30 issues an instruction for recovery to the imaging control unit 26.

The system control unit 30 transmits image data generated by the image processing unit 25 to the information processing apparatus 11, which is an external information processing apparatus, via the communication unit 31.

The system control unit 30 is also realized by a processor such as a CPU. Specifically, the processor performs a function of the system control unit 30 by executing a program read from a storage unit (not illustrated). The processor that realizes the system control unit 30 can be the processor 20, which realizes the image processing unit 25, the imaging control unit 26, the pan/tilt control unit 27, the blur correction unit 28, and the setting change unit 29, or can be a separate processor from the processor 20. The processor is disposed, for example, inside the bottom plate 2.

The communication unit 31 is a communication interface supporting the network 10 and is disposed, for example, inside the bottom plate 2. The communication unit 31 receives commands transmitted from the information processing apparatus 11, which is an external information processing apparatus, and transmits the commands to the system control unit 30. Further, the communication unit 31 transmits responses to the commands to the information processing apparatus 11. Furthermore, the communication unit 31 transmits image data to the information processing apparatus 11, which is the external information processing apparatus.

The communication unit 31 can be connected to the network 10 via wires or wirelessly.

Note that the pan/tilt camera 1 can be connected directly to the information processing apparatus 11 without the network 10. For example, the pan/tilt camera 1 can be connected to the information processing apparatus 11 via a video image output interface, such as a serial digital interface (SDI), an audio input/output interface, or an external device input/output interface.

Details of Blur Correction Unit

Figure 4:
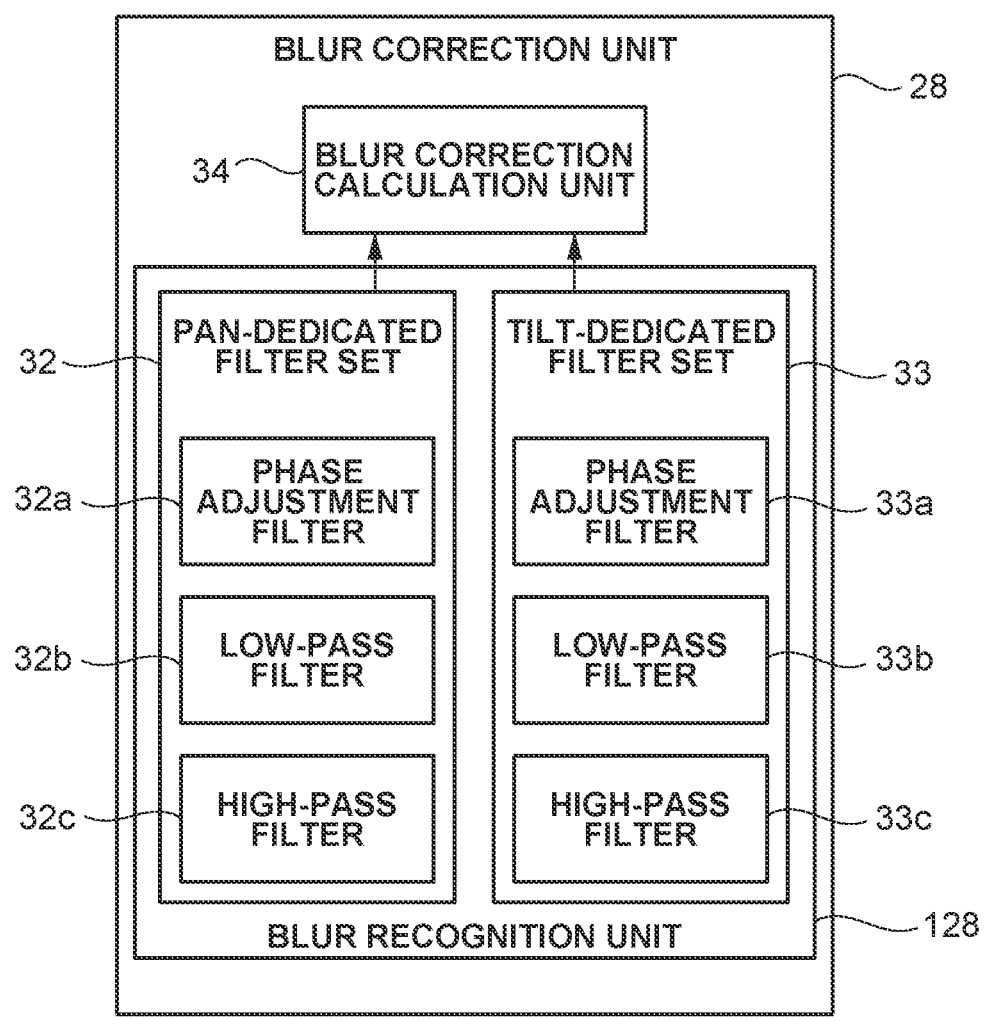
FIG. 4 is a block diagram illustrating details of a blur correction unit of the imaging apparatus according to an exemplary embodiment of the disclosure.

FIG. 4 illustrates details of the blur correction unit 28. As described above, the blur correction unit 28 includes the blur recognition unit 128. The blur recognition unit 128 includes a pan-dedicated filter set 32 and a tilt-dedicated filter set 33. The pan-dedicated filter set 32 derives a blur angle value to recognize (detect) a blur caused by a pan operation of the camera body 3. The tilt-dedicated filter set 33 derives a blur angle value to recognize (detect) a blur caused by a tilt operation of the camera body 3. The blur correction unit 28 further includes a blur correction calculation unit 34, and the blur correction calculation unit 34 calculates a blur correction amount based on the blur angle values derived by the filter sets 32 and 33.

The pan-dedicated filter set 32 includes a phase adjustment filter 32a, a low-pass filter 32b, and a high-pass filter 32c. Similarly, the tilt-dedicated filter set 33 includes a phase adjustment filter 33a, a low-pass filter 33b, and a high-pass filter 33c. The foregoing filters are digital filters with changeable setting values.

The high-pass filters 32c and 33c each attenuate low frequency components of angular velocity signals supplied from the blur detection unit 24 and transmit high frequency components of the angular velocity signals. Cutoff frequencies of the high-pass filters 32c and 33c are changeable. The low-pass filters 32b and 33b each attenuate high frequency components of angular velocity signals supplied from the blur detection unit 24 and transmit low frequency components of the angular velocity signals. Cutoff frequencies of the low-pass filters 32b and 33b are also changeable. The changing of the cutoff frequencies of the high-pass filters 32c and 33c and the low-pass filters 32b and 33b will be described below with reference to FIG. 6.

The phase adjustment filters 32a and 33a advance phases retarded by the low-pass filters 32b and 33b, respectively, and retard phases advanced by the high-pass filters 32c and 33c, respectively.

The low-pass filters 32b and 33b each integrate angular velocity signals supplied from the blur detection unit 24 and derive a blur angle value of the camera body 3. Specifically, the low-pass filter 32b of the pan-dedicated filter set 32 derives a blur angle value of the camera body 3 that is caused by a pan operation, whereas the low-pass filter 33b of the tilt-dedicated filter set 33 derives a blur angle value of the camera body 3 that is caused by a tilt operation.

The filter sets 32 and 33 each can include a digital bandpass filter instead of the high-pass filters 32c and 33c and the low-pass filters 32b and 33b. In this case, upper and lower cutoff frequencies of each bandpass filter are changeable. In this case, each bandpass filter integrates angular velocity signals supplied from the blur detection unit 24 and derives a blur angle value of the camera body 3.

Figure 5:
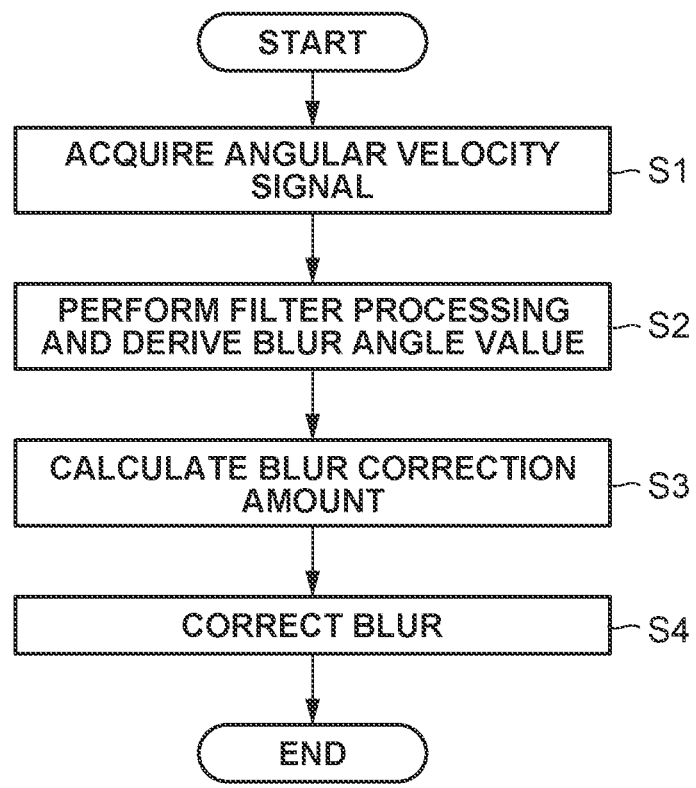
FIG. 5 is a flowchart illustrating a process of the blur correction unit of the imaging apparatus according to an exemplary embodiment of the disclosure.

FIG. 5 illustrates an example of a process of the blur correction unit 28. The process corresponding to this flowchart is realized by, for example, a CPU (system control unit 30) running on the imaging apparatus 1 by executing the corresponding program stored in a hard disk (HD) or the like. The process is periodic (e.g., 4-kHz period) and performed repeatedly. The process is performed in each of the yaw and pitch directions. While the process in FIG. 5 relates to the yaw direction, the same process is performed also on the pitch direction.

The process in FIG. 5 is also performed to correct a blur caused by the panning of the camera body 3 and to correct a blur caused by the tilting of the camera body 3. The correction of a blur caused by the panning will be described below, and the redundant description of the correction of a blur caused by the tilting is omitted.

First, in step S1, the blur recognition unit 128 of the blur correction unit 28 acquires an angular velocity signal of the yaw or pitch direction that is supplied from the blur detection unit 24.

In step S2, the blur recognition unit 128 performs filter processing on the angular velocity signal. Specifically, the blur recognition unit 128 removes noise, erroneously-detected components, and unwanted frequency components from the signal acquired in step S1 and extracts an appropriate angular velocity signal using the high-pass filter 32c, the low-pass filter 32b, and the phase adjustment filter 32a. The foregoing filter processing is performed because the signal acquired in step S1 may contain noise and erroneously-detected components and performing blur correction based on the signal acquired in step S1 may result in inappropriate correction. As described below with reference to FIG. 6, the filter processing is performed also in order to limit a frequency band over which the blur recognition (detection) is to be performed.

In step S2, the low-pass filter 32b integrates a value of the angular velocity signal having undergone the removal of noise, erroneously-detected components, and unwanted frequency components. A blur angle value of the camera body 3 that is caused by panning is derived from the angular velocity.

In step S3, the blur correction calculation unit 34 of the blur correction unit 28 calculates a necessary blur correction amount based on the blur angle value derived in step S2. Specifically, the blur correction amount is calculated to obtain a value that cancels the blur angle value (i.e., a value obtained by reversing a plus/minus of the blur angle value). For example, in a case where the angle value calculated in step S3 is a pitch angle of 0.5°, the blur correction amount is −0.5°.

In step S4, the blur correction unit 28 corrects the blur by the blur correction amount calculated in step S3. Specifically, the blur correction unit 28 controls the imaging unit 21 and drives the blur correction lens in the lens barrel 7 by the blur correction amount.

Thereafter, the process is ended, and the same process is performed again in the next performance period.

The foregoing process applies to a process of correcting a blur caused by tilting. Specifically, in step S2, the blur recognition unit 128 removes noise and erroneously-detected components from the signal acquired in step S1 and extracts an appropriate angular velocity signal using the high-pass filter 33c, the low-pass filter 33b, and the phase adjustment filter 33a. The low-pass filter 33b integrates a value of the angular velocity signal having undergone the removal of noise, erroneously-detected components, and unwanted frequency components and derives a blur angle value of the camera body 3 that is caused by tilting from the angular velocity.

Periodical operation of the above-described process brings the correction lens to be driven to cancel a blur based on the blur, whereby the blur of a video image captured by the camera body 3 is corrected.

Process of Setting Change Unit According to First Exemplary Embodiment

Figure 6:
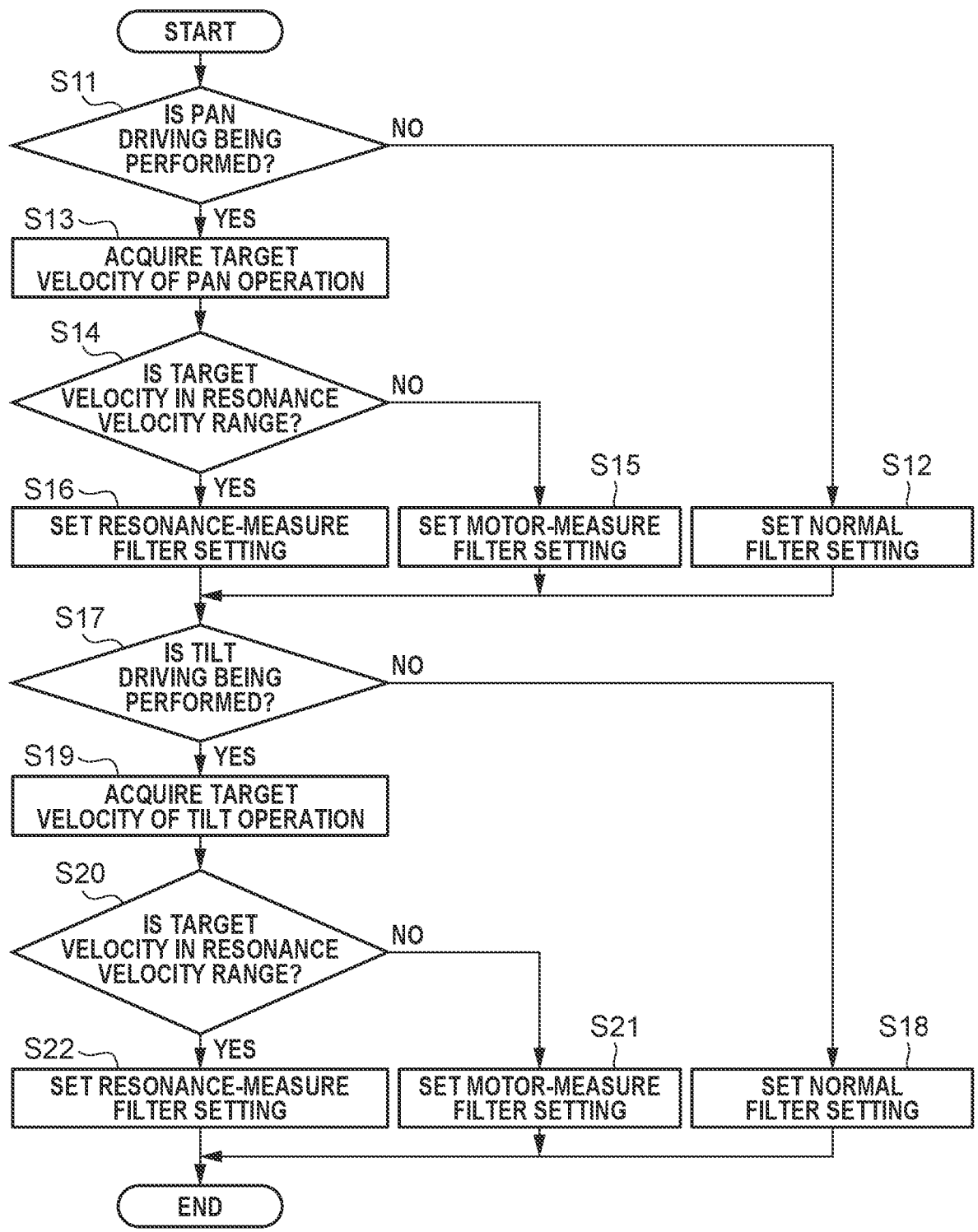
FIG. 6 is a flowchart illustrating a process of a setting change unit of the imaging apparatus according to a first exemplary embodiment of the disclosure.

Next, a process of the setting change unit 29 to set a filter setting of the filter sets 32 and 33 of the blur recognition unit 128 will be described below with reference to FIG. 6. The process corresponding to this flowchart is performed by, for example, a CPU (system control unit 30) running on the imaging apparatus 1 by executing a program stored in the HD or the like. The process in FIG. 6 is periodic (e.g., 60-Hz period) and performed repeatedly.

First, in step S11, the setting change unit 29 determines whether pan driving is being performed based on a drive state of the pan drive unit 22 or a control state of the pan/tilt control unit 27.

For example, a pan drive flag can be supplied to the setting change unit 29 from the pan/tilt control unit 27. In a case where the pan drive motor 22a is driving, the pan drive flag is "1", whereas in a case where the pan drive motor 22a is being stopped, the pan drive flag is "0". Thus, the determination in step S11 can be performed based on the pan drive flag, which increases ease of the signal processing.

The setting change unit 29 can determine whether pan driving is being performed based on an output of the angular velocity sensor 24a. Alternatively, the setting change unit 29 can acquire a motion vector of the video image captured by the camera body 3 from the image processing unit 25 and can determine whether pan driving is being performed, based on the motion vector relating to the panning.

In a case where the setting change unit 29 determines that pan driving is being performed (YES in step S11), the processing proceeds to step S13. In a case where the setting change unit 29 determines whether pan driving is not being performed (NO in step S11), the processing proceeds to step S12.

In step S12, since the pan drive motor 22a is being stopped, the setting change unit 29 sets a normal filter setting to the pan-dedicated filter set 32 of the blur recognition unit 128. Specifically, the pan-dedicated filter set 32 is set such that the blur correction unit 28 performs the blur recognition (detection) over a wide frequency band to correct a blur. Such a setting is used because a blur occurrence frequency in the camera body 3 is unpredictable in advance.

In step S12, for example, the cutoff frequency of the low-pass filter 32b is set at 0.1 hertz (Hz) and the cutoff frequency of the high-pass filter 32c is also set at 0.1 Hz, whereby blur recognition (detection) can be performed over a frequency band from 0.5 Hz to 30 Hz. The phase of the phase adjustment filter 32a is set to match the settings of the filters 32b and 32c as needed.

Then, the processing proceeds to step S17.

In step S13, the setting change unit 29 acquires a target velocity of a pan operation. The target velocity of the pan operation is a target velocity at which the pan/tilt control unit 27 controls the pan drive motor 22a.

For example, in a case where the user of the information processing apparatus 11 issues a pan instruction, the target velocity of panning that is transmitted to the pan/tilt control unit 27 of the processor 20 via the communication unit 31 and the system control unit 30 is supplied from the pan/tilt control unit 27 to the setting change unit 29.

A PWM control drive frequency of the pan drive motor 22a that is calculated based on the target velocity of panning by the pan/tilt control unit 27 can be supplied to the setting change unit 29. In this case, the setting change unit 29 can calculate the target velocity of the pan drive motor 22a based on the drive frequency.

Alternatively, as described above, in a case where the user of the information processing apparatus 11 instructs the pan/tilt camera 1 to perform the preset function, the pan/tilt control unit 27 calculates target velocities of panning and tilting based on a drive angle and time that are designated by the user. The calculated target velocity of panning can be supplied to the setting change unit 29 from the pan/tilt control unit 27.

Next, in step S14, whether the target velocity of panning is within a known resonance velocity range in pan driving is determined. The term "resonance velocity range" refers to a motor rotation velocity range in which the camera body 3 resonates and a vibration or strange noise that is significant enough to cause a blurred video image may occur.

According to the present exemplary embodiment, a stepping motor is used, and resonance occurs in the camera body 3 in a particular drive frequency band of the stepping motor. For example, it is known that resonance occurs in a case where the pan drive motor 22a is driven at an angular velocity of 1 degrees per second (deg/s) to 3 deg/s. Thus, the known resonance velocity range in pan driving is, for example, 1 deg/s to 3 deg/s.

In a case where it is determined that the target velocity of panning is within the known resonance velocity range in panning (YES in step S14), the processing proceeds to step S16. In a case where it is determined that the target velocity of panning is not within the known resonance velocity range in panning (NO in step S14), the processing proceeds to step S15.

In step S15, the setting change unit 29 sets a motor-measure filter setting to the pan-dedicated filter set 32 of the blur recognition unit 128.

The motor-measure filter setting in step S15 is used to exclude, from the blur detection, a signal component of a frequency band relating to starting and continuation of rotation of the pan drive motor 22a and a signal component caused by a swing back of the camera body 3 in stopping the pan drive motor 22a. Thus, the set frequency band over which the pan-dedicated filter set 32 performs the blur recognition (detection) is narrower than the set frequency band in step S12 and does not include frequency bands generated in rotation and stopping of the pan drive motor 22a. For example, a high cutoff frequency is set to the low-pass filter 32b. The cutoff frequency of the high-pass filter 32c can be the same as that in step S12.

In step S15, in order to recognize (detect) a blur in the frequency band from 20 Hz to 30 Hz, for example, the cutoff frequency of the low-pass filter 32b is set at 10 Hz, and the cutoff frequency of the high-pass filter 32c is set at 0.1 Hz. The phase of the phase adjustment filter 32a can be set to match the settings of the filters 32b and 32c as needed.

Then, the processing proceeds to step S17.

In step S16, the setting change unit 29 sets a resonance-measure filter setting to the pan-dedicated filter set 32 of the blur recognition unit 128. Specifically, the pan-dedicated filter set 32 is set such that the blur recognition unit 128 performs the blur recognition (detection) over a narrow frequency band corresponding to a blur that is caused by resonance in the camera body 3 due to rotation of the pan drive motor 22a, and the blur correction unit 28 corrects the blur. Thus, the set frequency band over which the pan-dedicated filter set 32 performs blur recognition (detection) is significantly narrower than those in steps S12 and S15.

In the present exemplary embodiment, it is known that a blur of a video image of a case where resonance occurs in the camera body 3 due to rotation of the pan drive motor 22a occurs in a frequency of 15 Hz, as a result of analyzing the video image. Thus, in step S16, the pan-dedicated filter set 32 is set such that the blur recognition unit 128 to perform blur recognition (detection) over a frequency band from 14 Hz to 16 Hz, for example. With the foregoing setting, the blur recognition unit 128 can recognize (detect) a blur caused by resonance due to rotation of the pan drive motor 22a, and the blur correction unit 28 corrects the blur.

In step S16, in order to recognize (detect) a blur over a frequency band from 14 Hz to 16 Hz, for example, the cutoff frequency of the low-pass filter 32b is set at 0.1 Hz, and the cutoff frequency of the high-pass filter 32c is set at 10 Hz. The phase of the phase adjustment filter 32a can be set to match the settings of the filters 32b and 32c as needed.

Then, the processing proceeds to step S17.

In step S17, the setting change unit 29 determines whether tilt driving is being performed based on a drive state of the tilt drive unit 23 or a control state of the pan/tilt control unit 27.

For example, a tilt drive flag can be supplied to the setting change unit 29 from the pan/tilt control unit 27. In a case where the tilt drive motor 23a is driving, the tilt drive flag is "1", whereas in a case where the tilt drive motor 23a is stopped, the tilt drive flag is "0". Thus, the determination in step S17 can be performed based on the tilt drive flag, which increases ease of the signal processing.

The setting change unit 29 can determine whether tilt driving is being performed based on an output of the angular velocity sensor 24a. Alternatively, the setting change unit 29 can acquire a motion vector of the video image captured by the camera body 3 from the image processing unit 25 and can determine whether tilt driving is being performed, based on the motion vector relating to the tilting.

In a case where the setting change unit 29 determines that tilt driving is being performed (YES in step S17), the processing proceeds to step S19. In a case where the setting change unit 29 determines that tilt driving is not being performed (NO in step S17), the processing proceeds to step S18.

In step S18, since the tilt drive motor 23a is being stopped, the setting change unit 29 sets the normal filter setting to the tilt-dedicated filter set 33 of the blur recognition unit 128. Specifically, the tilt-dedicated filter set 33 is set such that the blur correction unit 28 perform the blur recognition (detection) over a wide frequency band to correct a blur. Such a setting is performed because a blur occurrence frequency in the camera body 3 is unpredictable in advance.

In step S18, the cutoff frequencies of the low-pass filter 33b and the high-pass filter 33c are set such that blur recognition (detection) can be performed over a wide frequency band. A phase of the phase adjustment filter 33a can be set to match the settings of the filters 33b and 33c as needed.

Then, the process is ended.

In step S19, the setting change unit 29 acquires a target velocity of a tilt operation. The target velocity of the tilt operation is a target velocity at which the pan/tilt control unit 27 controls the tilt drive motor 23a.

For example, in a case where the user of the information processing apparatus 11 issues a tilt instruction, the target velocity of tilting that is transmitted to the pan/tilt control unit 27 of the processor 20 via the communication unit 31 and the system control unit 30 is supplied from the pan/tilt control unit 27 to the setting change unit 29.

A PWM control drive frequency of the tilt drive motor 23a that is calculated based on the target velocity of tilting by the pan/tilt control unit 27 can be supplied to the setting change unit 29. In this case, the setting change unit 29 can calculate the target velocity of the tilt drive motor 23a based on the drive frequency.

Alternatively, as described above, in a case where the user of the information processing apparatus 11 instructs the pan/tilt camera 1 to perform the preset function, the pan/tilt control unit 27 calculates target velocities of panning and tilting based on a drive angle and time that are designated by the user. The calculated target velocity of tilting can be supplied to the setting change unit 29 from the pan/tilt control unit 27.

Next, in step S20, whether the target velocity of tilting is within a known resonance velocity range in tilt driving is determined. In a case where it is determined that the target velocity of tilting is within a known resonance velocity range in tilt driving (YES in step S20), the processing proceeds to step S22. In a case where it is determined that the target velocity of tilting is not within a known resonance velocity range in tilt driving (NO in step S20), the processing proceeds to step S21.

In step S21, the setting change unit 29 sets the motor-measure filter setting to the tilt-dedicated filter set 33 of the blur correction unit 28.

The motor-measure filter setting in step S21 is used to exclude, from the blur recognition (detection), a signal component of a frequency band that relates to starting and continuation of rotation of the tilt drive motor 23a and a signal component that is caused by a swing back of the camera body 3 in stopping the tilt drive motor 23a. Thus, the set frequency band over which the tilt-dedicated filter set 33 performs the blur recognition (detection) is narrower than the set frequency band in step S18 and does not include frequency bands generated in rotation and stopping of the tilt drive motor 23a. For example, a high cutoff frequency is set to the low-pass filter 33b. The cutoff frequency of the high-pass filter 33c can be the same as that in step S18. The phase of the phase adjustment filter 33a can be set to match the settings of the filters 33b and 33c as needed.

Then, the process is ended.

In step S22, the setting change unit 29 sets the resonance-measure filter setting to the tilt-dedicated filter set 33 of the blur recognition unit 128. Specifically, the tilt-dedicated filter set 33 is set such that the blur recognition unit 128 performs blur recognition (detection) over a narrow frequency band corresponding to a blur that is caused by resonance in the camera body 3 due to rotation of the tilt drive motor 23a, and the blur correction unit 28 corrects the blur. Thus, the set frequency band over which the blur recognition (detection) is performed by the tilt-dedicated filter set 33 is significantly narrower than those in steps S18 and S21.

With the foregoing setting, the blur recognition unit 128 can recognize (detect) a blur caused by resonance due to rotation of the tilt drive motor 23a, and the blur correction unit 28 can correct the blur.

In step S21, the cutoff frequencies of the low-pass filter 33b and the high-pass filter 33c are set such that the blur recognition (detection) is performed over a narrow frequency band. The phase of the phase adjustment filter 33a can be set to match the settings of the filters 33b and 33c as needed.

Then, the process is ended.

After the process is ended, the same process is performed again in the next performance period.

Periodical operation of the above-described process brings the filter setting of the blur recognition unit 128 to be set such that the blur recognition unit 128 appropriately recognizes (detects) a blur, and even in a case where the target velocity of panning or the target velocity of tilting is changed, the filter setting is appropriately performed.

In the present exemplary embodiment, in a case where the target velocity of the pan drive motor 22a in pan driving is within the known resonance velocity range in pan driving, the setting change unit 29 sets the resonance-measure filter setting to the pan-dedicated filter set 32 of the blur correction unit 28 (step S16). Thus, the blur recognition unit 128 performs the blur recognition (detection) over a narrow frequency band corresponding to a blur that is caused by resonance in the camera body 3 due to rotation of the pan drive motor 22a, and the blur correction unit 28 corrects the blur.

In a case where the target velocity of the pan drive motor 22a in pan driving is not within the resonance velocity range in pan driving, the setting change unit 29 sets the motor-measure filter setting to the pan-dedicated filter set 32 of the blur correction unit 28 (step S15). Thus, the blur recognition unit 128 performs the blur recognition (detection) over a wide frequency band excluding a frequency of a signal component caused by rotation and stopping of the pan drive motor 22a.

Furthermore, in a case where pan driving is not being performed, the setting change unit 29 sets the normal filter setting to the pan-dedicated filter set 32 of the blur correction unit 28 (step S12). Thus, the blur recognition unit 128 performs the blur recognition (detection) over a wide frequency band where a blur may occur, and the blur correction unit 28 corrects the blur.

Furthermore, in a case where the target velocity of the tilt drive motor 23a in tilt driving is within the known resonance velocity range in tilt driving, the setting change unit 29 sets the resonance-measure filter setting to the tilt-dedicated filter set 33 of the blur correction unit 28 (step S22). Thus, the blur recognition unit 128 performs the blur recognition (detection) over a narrow frequency band corresponding to a blur that is caused by resonance in the camera body 3 due to rotation of the tilt drive motor 23a, and the blur correction unit 28 corrects the blur.

In a case where the target velocity of the tilt drive motor 23a in tilt driving is not within the resonance velocity range in tilt driving, the setting change unit 29 sets the motor-measure filter setting to the tilt-dedicated filter set 33 of the blur correction unit 28 (step S21). Thus, the blur recognition unit 128 performs the blur recognition (detection) over a wide frequency band excluding a frequency of a signal component caused by rotation and stopping of the tilt drive motor 23a.

Furthermore, in a case where tilt driving is not being performed, the setting change unit 29 sets the normal filter setting to the tilt-dedicated filter set 33 of the blur correction unit 28 (step S18). Thus, the blur recognition unit 128 performs the blur recognition (detection) over a wide frequency band where a blur may occur, and the blur correction unit 28 corrects the blur.

In the present exemplary embodiment, the setting change unit 29 performs the process from step S11 to step S16 as the measure against a blur caused by pan driving and the process from step S17 to step S22 as the measure against a blur caused by tilt driving. In a case where resonance does not occur in the camera body 3 in pan or tilt driving, the process as the measure against a blur corresponding to the driving causing no resonance can be skipped. For example, in a case where it is known that resonance does not occur in tilt driving, the process from step 17 to step S22 can be skipped. Alternatively, the processes of steps S19, S20, and S22 are skipped, and the process of step S21 is performed in a case where tilt driving is being performed, or the process of step S18 is performed in a case where tilting is being stopped.

The process described above with reference to FIG. 6 is applied to both a case where the user of the information processing apparatus 11, which is an external information processing apparatus, specifies the target velocity of panning or tilting to the pan/tilt camera 1 and a case where the user of the information processing apparatus 11, which is the external information processing apparatus, instructs the pan/tilt camera 1 to perform the preset function. Thus, a blur of a video image due to resonance is reduced or prevented both in a case where the user specifies the target velocity of panning or tilting and in a case where the user issues an instruction to perform the preset function.

Process of Setting Change Unit According to Second Exemplary Embodiment

Next, the pan/tilt camera 1 according to a second exemplary embodiment of the disclosure will be described below. The pan/tilt camera 1 according to the second exemplary embodiment has a similar configuration to that according to the first exemplary embodiment, and the process of the blur correction unit 28 in FIG. 6 is also performed in the second exemplary embodiment.

In the second exemplary embodiment, the setting change unit 29 performs a process similar to that in the first exemplary embodiment, except that the setting change unit 29 performs the resonance-measure filter setting or the motor-measure filter setting in accordance with a position of the zoom lens in the lens barrel 7 for the following reason. Specifically, in a case where the position of the zoom lens is on the telephoto end side, a blur of a video image due to resonance in the camera body 3 is often significant, whereas in a case where the position of the zoom lens is on the wide end side, a blur of a video image due to resonance is often insignificant.

Thus, information indicating the position of the zoom lens is supplied to the setting change unit 29 from the imaging control unit 26.

Figure 7:
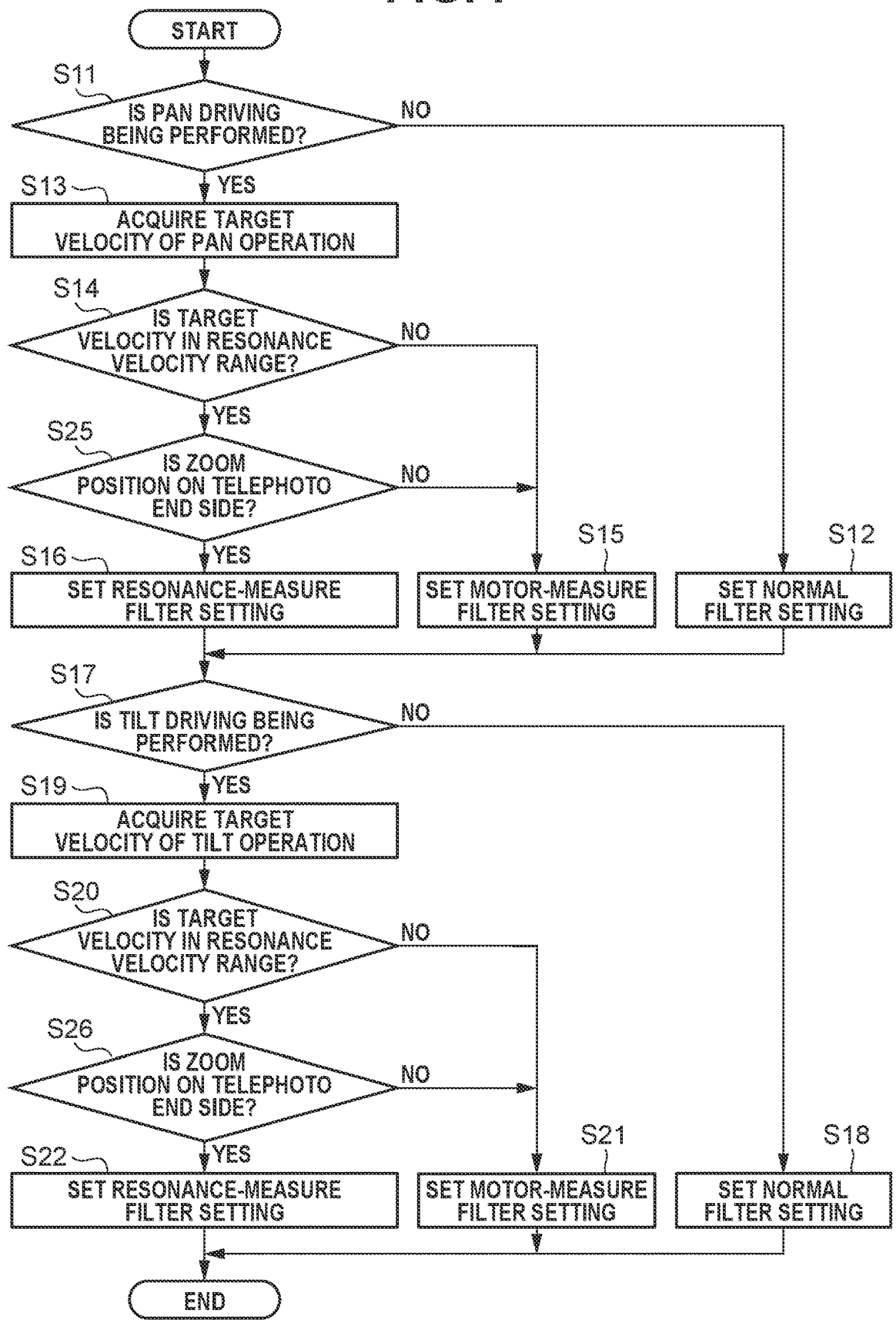
FIG. 7 is a flowchart illustrating a process of a setting change unit of the imaging apparatus according to a second exemplary embodiment of the disclosure.

A process of setting the filter setting of the filter sets 32 and 33 of the blur recognition unit 128 by the setting change unit 29 will be described below with reference to FIG. 7. The process corresponding to this flowchart is realized by, for example, the CPU (system control unit 30) running on the imaging apparatus 1 by executing the corresponding program stored in the HD or the like. The process in FIG. 7 is periodic (e.g., 60-Hz period) and performed repeatedly. In FIG. 7, each step corresponding to a step in FIG. 6 is given the same reference numeral as the corresponding step, and the redundant description is omitted.

According to the second exemplary embodiment, in a case where it is determined that the target velocity of panning is within a known resonance velocity range in pan driving (YES in step S14), the processing proceeds to step S25. In a case where it is determined that the target velocity of panning is not within a known resonance velocity range in pan driving (NO in step S14), the processing proceeds to step S15.

In step S25, the setting change unit 29 determines whether the zoom position (the position of the zoom lens) is on the telephoto end side, i.e., closer to the telephoto end with respect to a middle position. The middle position refers to a position halfway between the telephoto end and the wide end.

In a case where the setting change unit 29 determines that the zoom position is on the telephoto end side (YES in step S25), the processing proceeds to step S16. Thus, the setting change unit 29 sets the resonance-measure filter setting to the pan-dedicated filter set 32 of the blur recognition unit 128.

In a case where the zoom position is at the middle position or on the wide end side, i.e., a position between the middle position and the wide end, more specifically, in a case where the setting change unit 29 determines that the zoom position is not on the telephoto end side (NO in step S25), the processing proceeds to step S15. In step S15, the setting change unit 29 sets the motor-measure filter setting to the pan-dedicated filter set 32 of the blur recognition unit 128.

In a case where it is determined that the target velocity of tilting is within the known resonance velocity range in tilt driving (YES in step S20), the processing proceeds to step S26. In a case where it is determined that the target velocity of tilting is not within the known resonance velocity range in tilt driving (NO in step S20), the processing proceeds to step S21.

In step S26, the setting change unit 29 determines whether the zoom position is on the telephoto end side, i.e., closer to the telephoto end with respect to the middle position.

In a case where the setting change unit 29 determines that the zoom position is on the telephoto end side (YES in step S26), the processing proceeds to step S22. Thus, the setting change unit 29 sets the resonance-measure filter setting to the tilt-dedicated filter set 33 of the blur recognition unit 128.

In a case where the zoom position is at the middle position or on the wide end side, i.e., a position between the middle position and the wide end, more specifically, in a case where the setting change unit 29 determines that the zoom position is not on the telephoto end side (NO in step S26), the processing proceeds to step S21. Thus, the setting change unit 29 sets the motor-measure filter setting to the tilt-dedicated filter set 33 of the blur recognition unit 128.

After the process is ended, the same process is performed again in the next performance period.

Periodical operation of the above-described process brings the filter setting of the blur recognition unit 128 to be set such that the blur recognition unit 128 appropriately recognizes (detects) a blur, and even in a case where the target velocity of panning or the target velocity of tilting is changed, the filter setting is appropriately set. Further, even in a case where the position of the zoom lens is changed, the filter setting is appropriately set.

As described above, in the present exemplary embodiment, the filter setting is set in accordance with the position of the zoom lens. Specifically, in a case where the target velocity of the pan drive motor 22a or the tilt drive motor 23a is in the resonance velocity range and a blur of a video image is often significant, which is a case where the zoom position is on the telephoto end side, the setting change unit 29 sets the resonance-measure filter setting (steps S16 and S22). Thus, the blur recognition unit 128 performs the blur recognition (detection) over a narrow frequency band corresponding to a blur that is caused by resonance, and the blur correction unit 28 corrects the blur.

In a case where a blur of a video image is often insignificant, which is a case where the zoom position is on the wide end side, even when the target velocities of the pan drive motor 22a and the tilt drive motor 23a are within the resonance velocity range, the setting change unit 29 sets the motor-measure filter setting (steps S15 and S21). Thus, the blur recognition unit 128 performs the blur recognition (detection) over a wide frequency band excluding a frequency of a signal component caused by rotation and stopping of the pan drive motor 22a and the tilt drive motor 23a.

In a case where the target velocity of the pan drive motor 22a or the tilt drive motor 23a is not within the resonance velocity range, the setting change unit 29 sets the motor-measure filter setting (steps S15 and S21). Thus, the blur recognition unit 128 performs the blur recognition (detection) over a wide frequency band excluding a frequency of a signal component caused by rotation and stopping of the pan drive motor 22a and the tilt drive motor 23a.

Furthermore, in a case where neither pan nor tilt driving is being performed, the setting change unit 29 sets the normal filter setting (steps S12 and S18). Thus, the blur recognition unit 128 performs the blur recognition (detection) over a wide frequency band where a blur may occur, and the blur correction unit 28 corrects the blur.

In the present exemplary embodiment, the setting change unit 29 performs the process from step S11 to step S16 and step S25 as the measure against a blur caused by pan driving and the process from step S17 to step S22 and step S26 as the measure against a blur caused by tilt driving. In a case where resonance does not occur in the camera body 3 in pan or tilt driving, however, the process as a measure against a blur can be skipped because the driving causes no resonance. For example, in a case where it is known that resonance does not occur in tilt driving, the process from step S17 to step S22 and step S26 can be skipped. Alternatively, the processes of steps S19, S20, S22, and S26 are skipped, and the process of step S21 is performed in a case where tilt driving is being performed, or the process of step S18 is performed in a case where tilting is being stopped.

The process described above with reference to FIG. 7 is applied to both a case where the user of the information processing apparatus 11, which is an external information processing apparatus, specifies the target velocity of panning or tilting to the pan/tilt camera 1 and a case where the user of the information processing apparatus 11, which is the external information processing apparatus, instructs the pan/tilt camera 1 to perform the preset function. Thus, a blur of a video image due to resonance is reduced or prevented both in a case where the user specifies the target velocity of panning or tilting and in a case where the user issues an instruction to perform the preset function.

Process of Setting Change Unit According to Third Exemplary Embodiment

Next, the pan/tilt camera 1 in a third exemplary embodiment of the disclosure will be described below. The pan/tilt camera 1 in the third exemplary embodiment has a similar configuration to that in the first exemplary embodiment, and the process of the blur correction unit 28 in FIG. 6 is also performed in the third exemplary embodiment.

In the third exemplary embodiment, the setting change unit 29 performs a similar process to that in the first exemplary embodiment, except that the setting change unit 29 determines whether the pan drive motor 22a and the tilt drive motor 23a are driven at a constant velocity, and in a case where the pan drive motor 22a and the tilt drive motor 23a are driven at a constant velocity, the setting change unit 29 sets the resonance-measure filter setting or the motor-measure filter setting to the filters of the blur recognition unit 128 in accordance with the motor velocities.

In a case where the pan drive motor 22a or the tilt drive motor 23a is not driven at a constant velocity (not rotated at a constant velocity), the motor-measure filter setting is set instead of the resonance-measure filter setting. In a case where a motor is accelerating or decelerating, a rotation velocity of the motor may fall within the resonance velocity range.

In the case where the motor is accelerating or decelerating, however, the period during which the rotation velocity of the motor is in the resonance velocity range is a short period of time. Thus, the setting change unit 29 sets the motor-measure filter setting, instead of the resonance-measure filter setting, to correct a blur over a wide frequency band.

Thus, information indicating whether each of the pan drive motor 22a and the tilt drive motor 23a is rotated at a constant velocity or at a non-constant velocity is supplied to the setting change unit 29 from the pan/tilt control unit 27.

For example, a pan constant velocity flag and a tilt constant velocity flag can be supplied to the setting change unit 29 from the pan/tilt control unit 27.

In a case where the pan drive motor 22a is driving at a constant velocity, the pan constant velocity flag is "1", whereas in a case where the pan drive motor 22a is accelerating or decelerating, the pan constant velocity flag is "0". In a case where the tilt drive motor 23a is driving at a constant velocity, the tilt constant velocity flag is "1", whereas in a case where the tilt drive motor 23a is accelerating or decelerating, the tilt constant velocity flag is "0". Thus, the setting change unit 29 can determine whether each of the pan drive motor 22a and the tilt drive motor 23a is rotated at a constant velocity or at a non-constant velocity based on the pan constant velocity flag and the tilt constant velocity flag, which increases ease of the signal processing.

Figure 8:
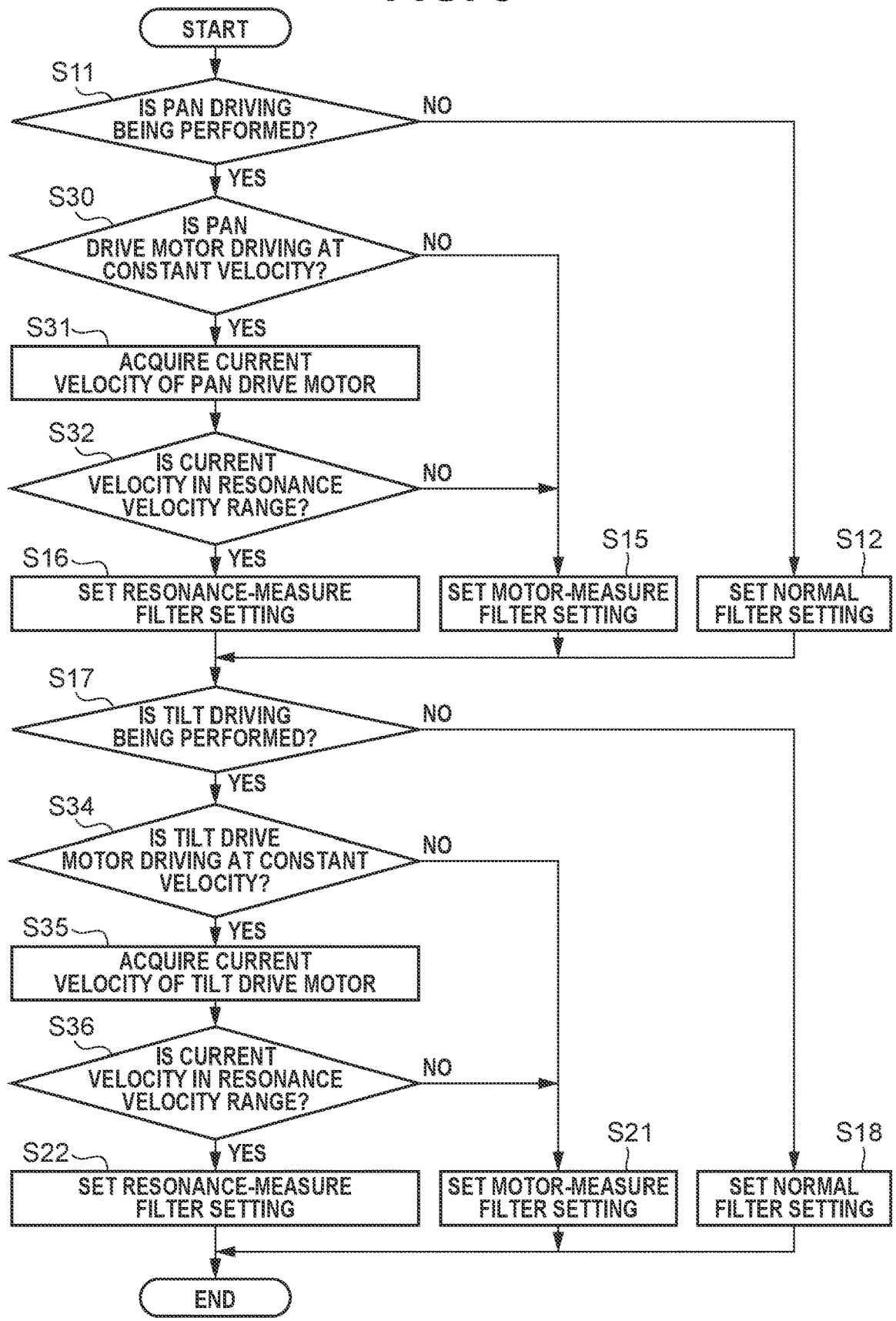
FIG. 8 is a flowchart illustrating a process of a setting change unit of the imaging apparatus according to a third exemplary embodiment of the disclosure.

A process of setting the filter setting of the filter sets 32 and 33 of the blur recognition unit 128 by the setting change unit 29 will be described below with reference to FIG. 8. The process corresponding to this flowchart is realized by, for example, the CPU (system control unit 30) running on the imaging apparatus 1 by executing the corresponding program stored in a HD or the like. The process in FIG. 8 is periodic (e.g., 60-Hz period) and performed repeatedly. In FIG. 8, each step corresponding to a step in FIG. 6 is given the same reference numeral as the corresponding step, and the redundant description is omitted.

In a case where the setting change unit 29 determines that pan driving is being performed (YES in step S11), the processing proceeds to step S30. In a case where the setting change unit 29 determines that pan driving is not being performed (NO in step S11), the processing proceeds to step S12.

In step S30, the setting change unit 29 determines whether the pan drive motor 22a is driving at a constant velocity. For example, as described above, the setting change unit 29 can perform the process in step S30 by determining whether the pan constant velocity flag is "1" or "0".

The setting change unit 29 can determine whether the pan drive motor 22a is driving at a constant velocity, based on an output of the angular velocity sensor 24a. Alternatively, the setting change unit 29 can acquire a motion vector of the video image captured by the camera body 3 from the image processing unit 25 and can determine whether the pan drive motor 22a is driving at a constant velocity, based on a change in magnitude of the motion vector relating to panning. In a case where a rate of change in magnitude of the motion vector in the pan direction is within a predetermined range, the pan drive motor 22a is driving at a constant velocity. Otherwise, the pan drive motor 22a is accelerating or decelerating.

In a case where the setting change unit 29 determines that the pan drive motor 22a is driving at a constant velocity (YES in step S30), the processing proceeds to step S31. In a case where the setting change unit 29 determines that the pan drive motor 22a is not driving at a constant velocity (NO in step S30), the processing proceeds to step S15.

In step S31, the setting change unit 29 acquires a current rotation velocity of the pan drive motor 22a. The current rotation velocity is a velocity at which the pan drive motor 22a currently drives the camera body 3.

For example, the PWM control drive frequency of the pan drive motor 22a is supplied from the pan/tilt control unit 27 to the setting change unit 29, and the setting change unit 29 calculates the current rotation velocity of the pan drive motor 22a based on the drive frequency. In this case, the current rotation velocity of the pan drive motor 22a is a current target velocity of the pan drive motor 22a.

The setting change unit 29 can calculate the current rotation velocity of the pan drive motor 22a, based on an output of the angular velocity sensor 24a. Alternatively, the setting change unit 29 can acquire a motion vector of the video image captured by the camera body 3 from the image processing unit 25 and can calculate the current rotation velocity of the pan drive motor 22a, based on magnitude of the motion vector relating to panning.

Next, in step S32, whether the current velocity of panning is in the known resonance velocity range in pan driving is determined. As described above, the "known resonance velocity range in pan driving" is, for example, 1 deg/s to 3 deg/s.

In a case where it is determined that the current velocity of panning is in the known resonance velocity range in pan driving (YES in step S32), the processing proceeds to step S16. In a case where it is determined that the current velocity of panning is not in the known resonance velocity range in pan driving (NO in step S32), the processing proceeds to step S15.

In the present exemplary embodiment, in a case where the current velocity of the pan drive motor 22a during pan driving at a constant velocity is in the known resonance velocity range in pan driving, the setting change unit 29 sets the resonance-measure filter setting to the pan-dedicated filter set 32 of the blur recognition unit 128 (step S16). Thus, the blur recognition unit 128 performs the blur recognition (detection) over a narrow frequency band corresponding to a blur that is caused by resonance in the camera body 3 due to rotation of the pan drive motor 22a, and the blur correction unit 28 corrects the blur.

In a case where the current velocity of the pan drive motor 22a during pan driving at a constant velocity is not in the resonance velocity range in pan driving, the setting change unit 29 sets the motor-measure filter setting to the pan-dedicated filter set 32 of the blur correction unit 28 (step S15). Thus, the blur recognition unit 128 performs the blur recognition (detection) over a wide frequency band excluding a frequency of a signal component caused by rotation and stopping of the pan drive motor 22a.

Furthermore, even when pan driving is being performed, in a case where the panning is accelerating or decelerating, the setting change unit 29 sets the motor-measure filter setting to the pan-dedicated filter set 32 of the blur correction unit 28 (step S15). Thus, the blur recognition unit 128 performs blur recognition (detection) over a wide frequency band excluding a frequency of a signal component caused by rotation and stopping of the pan drive motor 22a.

Furthermore, in a case where pan driving is not being performed, the setting change unit 29 sets the normal filter setting to the pan-dedicated filter set 32 of the blur correction unit 28 (step S12). Thus, the blur recognition unit 128 performs blur recognition (detection) over a wide frequency band where a blur may occur, and the blur correction unit 28 corrects the blur.

In a case where the setting change unit 29 determines that tilt driving is being performed (YES in step S17), the processing proceeds to step S34. In a case where the setting change unit 29 determines that tilt driving is not being performed (NO in step S17), the processing proceeds to step S18.

In step S34, the setting change unit 29 determines whether the tilt drive motor 23a is driving at a constant velocity. For example, as described above, the setting change unit 29 can perform the process of step S34 by determining whether the tilt constant velocity flag is "1" or "0".

The setting change unit 29 can determine whether the tilt drive motor 23a is driving at a constant velocity, based on an output of the angular velocity sensor 24a. Alternatively, the setting change unit 29 can acquire a motion vector of the video image captured by the camera body 3 from the image processing unit 25 and determine whether the tilt drive motor 23a is driving at a constant velocity, based on a change in magnitude of the motion vector relating to tilting. In a case where a rate of change in magnitude of the motion vector in the tilt direction is within a predetermined range, the tilt drive motor 23a is driving at a constant velocity. Otherwise, the tilt drive motor 23a is accelerating or decelerating.

In a case where the setting change unit 29 determines that the tilt drive motor 23a is driving at a constant velocity (YES in step S34), the processing proceeds to step S35. In a case where the setting change unit 29 determines that the tilt drive motor 23a is not driving at a constant velocity (NO in step S34), the processing proceeds to step S21.

In step S35, the setting change unit 29 acquires the current rotation velocity of the tilt drive motor 23a. The current rotation velocity is a velocity at which the tilt drive motor 23a currently rotates the camera body 3.

For example, the PWM control drive frequency of the tilt drive motor 23a is supplied from the pan/tilt control unit 27 to the setting change unit 29, and the setting change unit 29 calculates the current rotation velocity of the tilt drive motor 23a, based on the drive frequency. In this case, the current rotation velocity of the tilt drive motor 23a is a current target velocity of the tilt drive motor 23a.

The setting change unit 29 can calculate the current rotation velocity of the tilt drive motor 23a, based on an output of the angular velocity sensor 24a. Alternatively, the setting change unit 29 can acquire a motion vector of the video image captured by the camera body 3 from the image processing unit 25 and can calculate the current rotation velocity of the tilt drive motor 23a based on magnitude of the motion vector relating to tilting.

Next, in step S36, whether the current velocity of tilting is in the known resonance velocity range in tilt driving is determined.

In a case where it is determined that the current velocity of tilting is in the known resonance velocity range in tilt driving (YES in step S36), the processing proceeds to step S22. In a case where it is determined that the current velocity of tilting is not in the known resonance velocity range in tilt driving (NO in step S36), the processing proceeds to step S21.

In the present exemplary embodiment, in a case where the current velocity of the tilt drive motor 23a during tilt driving at a constant velocity is in the known resonance velocity range in tilt driving, the setting change unit 29 sets the resonance-measure filter setting to the tilt-dedicated filter set 33 of the blur recognition unit 128 (step S22). Thus, the blur recognition unit 128 performs blur recognition (detection) over a narrow frequency band corresponding to a blur that is caused by resonance in the camera body 3 due to rotation of the tilt drive motor 23a, and the blur correction unit 28 corrects the blur.

In a case where the current velocity of the tilt drive motor 23a during tilt driving at a constant velocity is not in the resonance velocity range in tilt driving, the setting change unit 29 sets the motor-measure filter setting to the tilt-dedicated filter set 33 of the blur correction unit 28 (step S21). Thus, the blur recognition unit 128 performs the blur recognition (detection) over a wide frequency band excluding a frequency of a signal component caused by rotation and stopping of the tilt drive motor 23a.

Furthermore, even when tilt driving is being performed, in a case where the tilting is accelerating or decelerating, the setting change unit 29 sets the motor-measure filter setting to the tilt-dedicated filter set 33 of the blur correction unit 28 (step S21). Thus, the blur recognition unit 128 performs the blur recognition (detection) over a wide frequency band excluding a frequency of a signal component caused by rotation and stopping of the tilt drive motor 23a.

Furthermore, in a case where tilt driving is not being performed, the setting change unit 29 sets the normal filter setting to the tilt-dedicated filter set 33 of the blur correction unit 28 (step S18). Thus, the blur recognition unit 128 performs the blur recognition (detection) over a wide frequency band where a blur may occur, and the blur correction unit 28 corrects the blur.

After the process is ended, the same process is performed again in the next performance period.

Periodical operation of the above-described process brings the filter setting of the blur recognition unit 128 to be set such that the blur recognition unit 128 appropriately recognizes (detects) a blur, and even in a case where the pan or tilt drive state is changed, the filter setting is appropriately set.

In the present exemplary embodiment, the setting change unit 29 performs the process from step S11 to step S16 and from step S30 to step S32 as the measure against the blur caused by pan driving and the process from step S17 to step S22 and from step S34 to step S36 as the measure against the blur caused by tilt driving. In a case where resonance does not occur in the camera body 3 in pan or tilt driving, however, the process as a measure against blurs can be skipped because the driving causes no resonance. For example, in a case where it is known that resonance does not occur in tilt driving, the process from step S17 to step S22 and from step S34 to step S36 can be skipped. Alternatively, the process from step S34 to step S36 and step S20 are skipped, and the process of step S21 is performed in a case where tilt driving is being performed, or the process of step S18 is performed in a case where tilting is being stopped.

The process described above with reference to FIG. 8 is applied to both a case where the user of the information processing apparatus 11, which is the external information processing apparatus, specifies the target velocity of panning or tilting to the pan/tilt camera 1 and a case where the user of the information processing apparatus 11, which is the external information processing apparatus, instructs the pan/tilt camera 1 to perform the preset function. Thus, a blur of a video image due to resonance is reduced or prevented both in a case where the user specifies the target velocity of panning or tilting and in a case where the user issues an instruction to perform the preset function.

Figure 9:
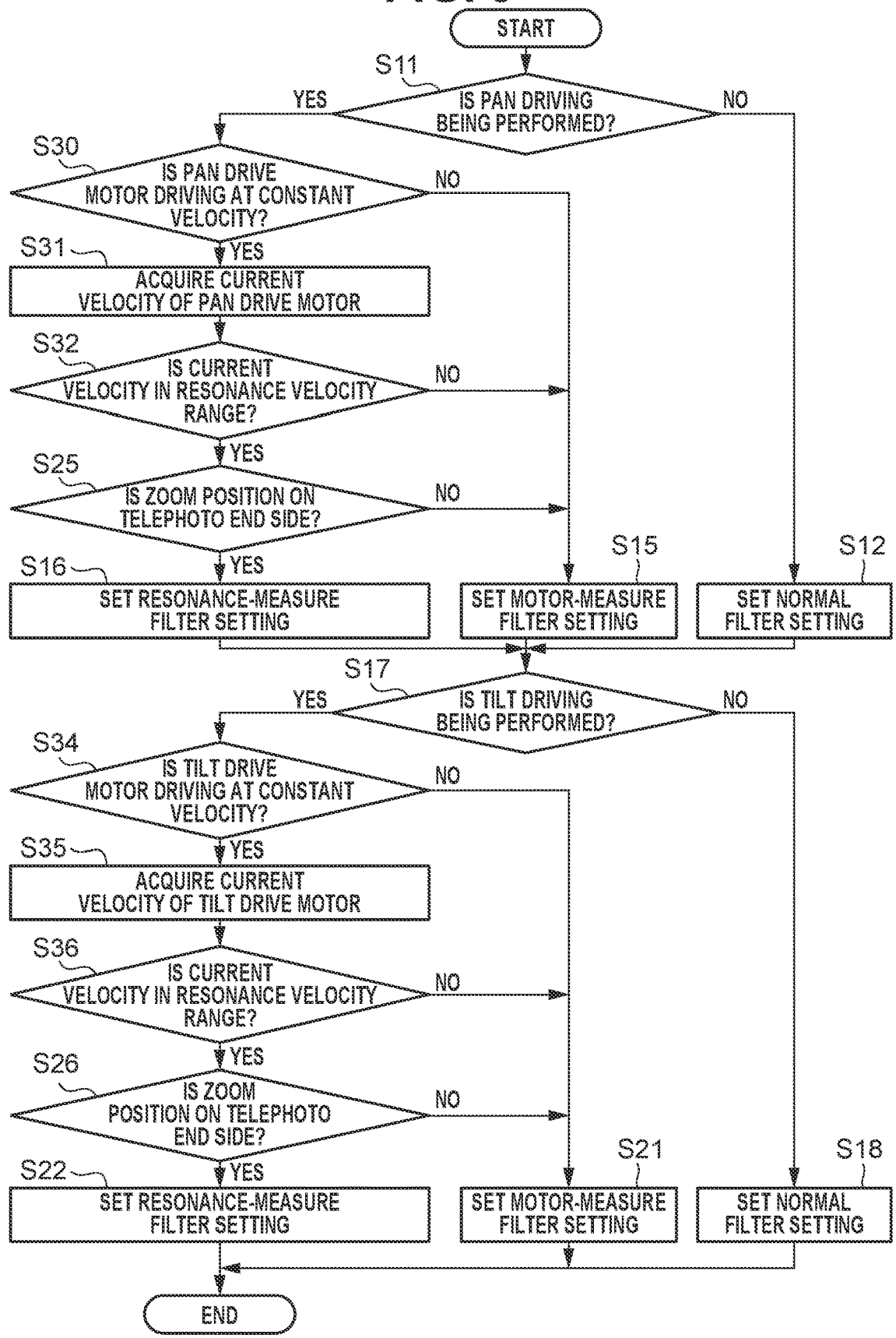
FIG. 9 is a flowchart illustrating a process of a setting change unit of the imaging apparatus according to a combination of the second and third exemplary embodiments of the disclosure.

As illustrated in FIG. 9, the second and third exemplary embodiments can be combined together. A process corresponding to this flowchart is realized by, for example, the CPU (system control unit 30) running on the imaging apparatus 1 by executing the corresponding program stored in a HD or the like. In the process in FIG. 9, in a case where it is determined that the current velocity of panning is in the known resonance velocity range in pan driving (YES in step S32), the processing proceeds to step S25. In a case where it is determined that the current velocity of panning is not in the known resonance velocity range in pan driving (NO in step S32), the processing proceeds to step S15.

In a case where the setting change unit 29 determines that the zoom position is on the telephoto end side (YES in step S25), the processing proceeds to step S16. In a case where the setting change unit 29 determines that the zoom position is not on the telephoto end side (NO in step S25), the processing proceeds to step S15.

In a case where it is determined that the current velocity of tilting is in the known resonance velocity range in tilt driving (YES in step S36), the processing proceeds to step S26. In a case where it is determined that the current velocity of tilting is not in the known resonance velocity range in tilt driving (NO in step S36), the processing proceeds to step S21.

In a case where the setting change unit 29 determines that the zoom position is on the telephoto end side (YES in step S26), the processing proceeds to step S22. In a case where the setting change unit 29 determines that the zoom position is not on the telephoto end side (NO in step S26), the processing proceeds to step S21.

Thus, the setting change unit 29 sets the resonance-measure filter setting or the motor-measure filter setting in accordance with the position of the zoom lens in the lens barrel 7.

Modified Examples

While various exemplary embodiments of the disclosure are described above, the above-described exemplary embodiments are not intended to limit the disclosure, and various modified examples including deletion, addition, and replacement of components within the technical scope of the disclosure are possible.

Figure 10:
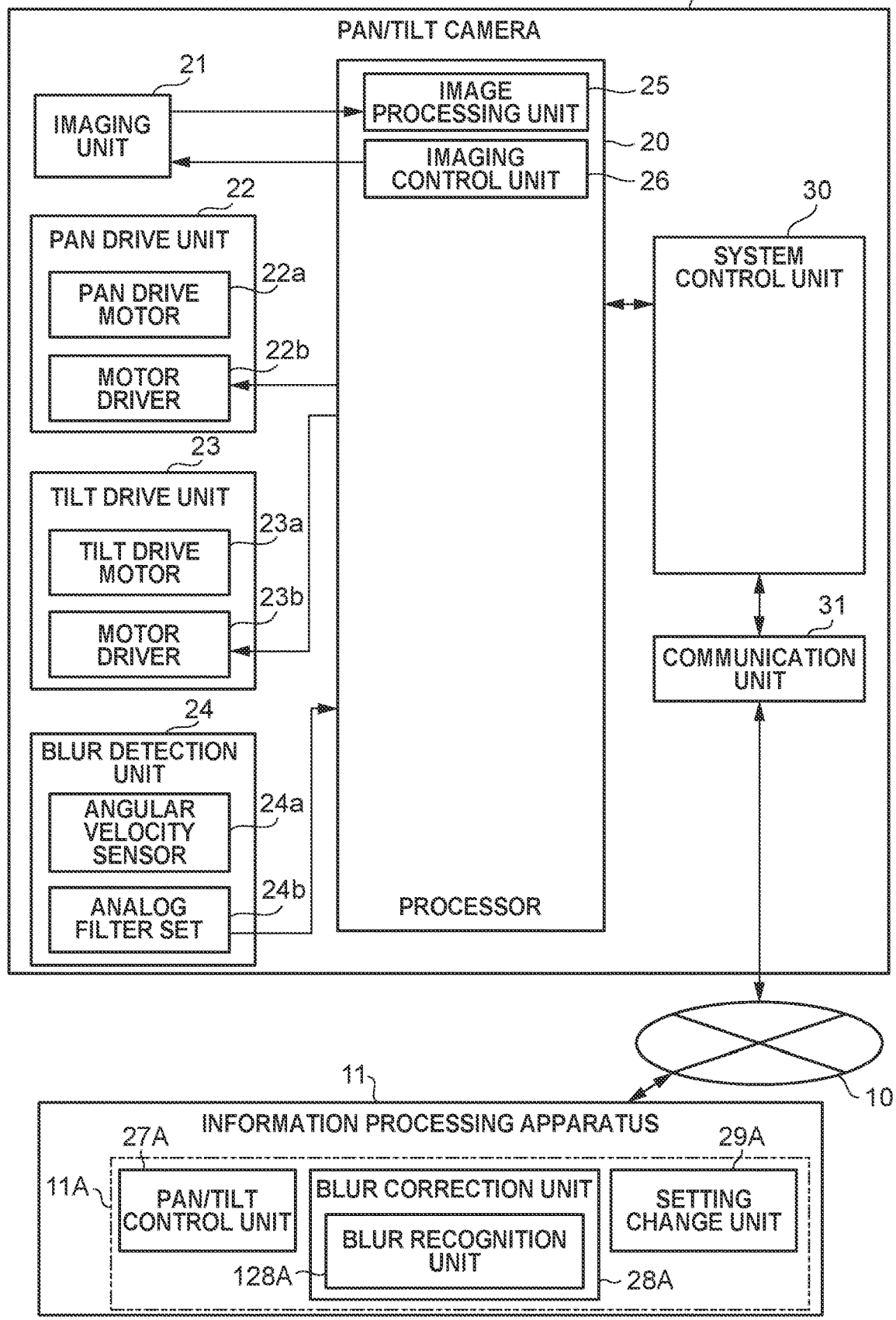
FIG. 10 is a block diagram illustrating an example of a functional configuration of a communication system according to a modified example of an exemplary embodiment of the disclosure.

For example, all or some or one of the functions including the image processing unit 25, the imaging control unit 26, the pan/tilt control unit 27, the blur correction unit 28, the setting change unit 29, of the processor 20 of the pan/tilt camera 1 can be performed by the information processing apparatus 11. FIG. 10 illustrates an example of a functional configuration of a communication system according to a modified example of the exemplary embodiments.

According to the modified example in FIG. 10, a processor 11A of the information processing apparatus 11 functions as a pan/tilt control unit 27A, a blur correction unit 28A, and a setting change unit 29A. The pan/tilt control unit 27A, the blur correction unit 28A, and the setting change unit 29A correspond to the pan/tilt control unit 27, the blur correction unit 28, and the setting change unit 29, respectively. The blur correction unit 28A includes a blur recognition unit 128A, and the blur recognition unit 128A corresponds to the blur recognition unit 128. The processor 11A performs the above-described functions by executing a program read from a storage unit (not illustrated). The processor 11A is not limited to the illustrated example and can function as one or more of the pan/tilt control unit 27A, the blur correction unit 28A, the blur recognition unit 128A, and the setting change unit 29A.

The disclosure can be realized by a process in which a program for realizing one or more functions of the processor 20 or 11A according to an exemplary embodiment is supplied to the processor 20 or 11A via a network or a recording medium and the processor 20 or 11A reads the program and executes the read program. In this case, the program (program codes) read from the recording medium realizes each of the functions of the exemplary embodiment. The recording medium storing the program constitutes the disclosure.

The processor 20 and 11A are mere examples, and a plurality of the functional blocks can form a single functional block, or the functional block can be divided into blocks to perform a plurality of functions. Further, at least one of the functional blocks can be implemented as hardware. In implementing a functional block as hardware, for example, a dedicated circuit can be generated automatically on a field programmable gate array (FPGA) from a program for realizing each step using a predetermined compiler. Further, a gate array circuit can be formed similarly to a FPGA to realize a functional block. Further, a functional block can be realized using an application specific integrated circuit (ASIC).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-070144, filed Apr. 21, 2022, which is hereby incorporated by reference herein in its entirety.

What is claimed is:

1. An apparatus comprising:
an imaging unit configured to acquire an image;
a drive unit configured to drive the imaging unit;
at least one processor; and
a memory coupled to the at least one processor storing instructions that, when executed by the at least one processor, cause the at least one processor to function as:
a control unit configured to control the drive unit;
a detection unit configured to detect a blur of the acquired image;
a correction unit configured to correct the detected blur of the image;

an acquisition unit configured to acquire a drive velocity at which the drive unit drives the imaging unit; and a setting unit configured to set the detection unit such that in a case where the drive velocity is in a resonance velocity range in which resonance occurs in the imaging unit, the detection unit detects the blur of the image at a first frequency band corresponding to a blur due to the resonance.

2. The apparatus according to claim 1, wherein the setting unit sets the detection unit such that in a case where the drive velocity is not in the resonance velocity range, the detection unit detects the blur of the image at a second frequency band broader than the first frequency band, and wherein the second frequency band does not include the first frequency band.

3. The apparatus according to claim 1, wherein in a case where the drive velocity does not drive the imaging unit, the setting unit sets the detection unit such that the detection unit detects the blur of the image at a third frequency band broader than the first frequency band.

4. The apparatus according to claim 3, wherein the second frequency band is narrower than the third frequency band and does not include a frequency band that is generated by rotation and stopping of the drive unit.

5. The apparatus according to claim 3, wherein the control unit supplies a flag to the setting unit, the flag indicating whether to drive the imaging unit.

6. The apparatus according to claim 1, wherein the drive velocity is a target velocity at which the control unit controls the drive unit, and wherein the acquisition unit acquires the target velocity from the control unit, or the acquisition unit acquires an index as a reference for the target velocity from the control unit and calculates the target velocity from the index.

7. The apparatus according to claim 1, wherein in a case where the drive unit is accelerating or decelerating the imaging unit, the setting unit sets the detection unit such that the detection unit detects the blur of the image at the second frequency band, wherein in a case where the drive unit is driving the imaging unit at a constant velocity and the drive velocity is in the resonance velocity range in which resonance occurs in the imaging unit, the setting unit sets the detection unit such that the detection unit detects the blur of the image at the first frequency band, and wherein in a case where the drive unit is driving the imaging unit at a constant velocity and the drive velocity is not in the resonance velocity range, the setting unit sets the detection unit such that the detection unit detects the blur of the image at the second frequency band.

8. The apparatus according to claim 7, wherein the control unit supplies a flag to the setting unit, the flag indicating whether the drive unit is driving at the constant velocity or at a non-constant velocity.

9. The apparatus according to claim 7, wherein the drive velocity is a current velocity at which the drive unit drives the imaging unit, and wherein the acquisition unit acquires an index as a reference for the current velocity from the control unit and calculates the current velocity from the index.

10. The apparatus according to claim 7, wherein the drive velocity is a current velocity at which the drive unit drives the imaging unit, and wherein the acquisition unit calculates the current velocity, based on an angular velocity of the imaging unit or the image captured by the imaging unit.

11. The apparatus according to claim 1, wherein the imaging unit includes a zoom lens and a mechanism configured to move the zoom lens, wherein in a case where the zoom lens is on a telephoto end side with respect to a middle position that is halfway between a telephoto end and a wide end and the drive velocity is in the resonance velocity range, the setting unit sets the detection unit such that the detection unit detects the blur of the image at the first frequency band, and wherein in a case where the zoom lens is at a position between the middle position and the wide end, the setting unit sets the detection unit such that the detection unit detects the blur of the image at the second frequency band regardless of the rotation velocity.

12. The apparatus according to claim 1, wherein the setting unit periodically repeats the setting of the detection unit based on the drive velocity.

13. The apparatus according to claim 1, wherein the drive unit includes a pan drive unit configured to drive the imaging unit in a pan direction and a tilt drive unit configured to drive the imaging unit in a tilt direction, and wherein the control unit performs a preset function of simultaneously starting driving of the pan drive unit and the tilt drive unit and simultaneously stopping driving of the pan drive unit and the tilt drive unit, and in a case where the preset function is to be performed, the control unit calculates a target velocity of the pan drive unit and a target velocity of the tilt drive unit and controls a drive velocity of the pan drive unit and a drive velocity of the tilt drive unit based on the calculated target velocities.

14. The apparatus according to claim 1, wherein the detection unit includes a digital filter configured to remove an unwanted frequency component from an angular velocity signal indicating an angular velocity of the imaging unit and a derivation unit configured to derive a blur angle value of the imaging unit by integrating the angular velocity signal having undergone the removal of the unwanted frequency component, wherein the correction unit includes a correction calculation unit configured to calculate a blur correction amount by which the blur angle value is cancelled based on the blur angle value, and wherein the setting unit sets a cutoff frequency of the digital filter.

15. A method comprising:

acquiring an image using an imaging unit;

driving the imaging unit;

detecting a blur of the acquired image;

correcting the detected blur of the image;

acquiring a drive velocity of the imaging unit; and setting the detecting such that in a case where the drive velocity is in a resonance velocity range in which resonance occurs in the imaging unit, the detecting detects the blur of the image at a first frequency band corresponding to a blur due to the resonance.

16. The method according to claim 15, wherein the setting sets the detecting such that in a case where the drive velocity is not in the resonance velocity range, the detecting detects the blur of the image at a second frequency band broader than the first frequency band, and wherein the second frequency band does not include the first frequency band.

17. The method according to claim 15, wherein in a case where the drive velocity does not drive the imaging unit, the setting sets the detecting such that the detecting detects the blur of the image at a third frequency band broader than the first frequency band.

18. A non-transitory computer-readable recording medium storing a program for causing a computer to execute a method, the method comprising:
    acquiring an image using an imaging unit;
    driving the imaging unit;
    detecting a blur of the acquired image;
    correcting the detected blur of the image;
    acquiring a drive velocity of the imaging unit; and
    setting the detecting such that in a case where the drive velocity is in a resonance velocity range in which resonance occurs in the imaging unit, the detecting detects the blur of the image at a first frequency band corresponding to a blur due to the resonance.

19. The non-transitory computer-readable recording medium according to claim 18,
    wherein the setting sets the detecting such that in a case where the drive velocity is not in the resonance velocity range, the detecting detects the blur of the image at a second frequency band broader than the first frequency band, and
    wherein the second frequency band does not include the first frequency band.

20. The non-transitory computer-readable recording medium according to claim 18, wherein in a case where the drive velocity does not drive the imaging unit, the setting sets the detecting such that the detecting detects the blur of the image at a third frequency band broader than the first frequency band.

* * * * *